Nov. 5, 1929.         L. C. SMITH         1,734,605
              CORD TAKE-UP AND PROTECTOR
                  Filed Aug. 21, 1926
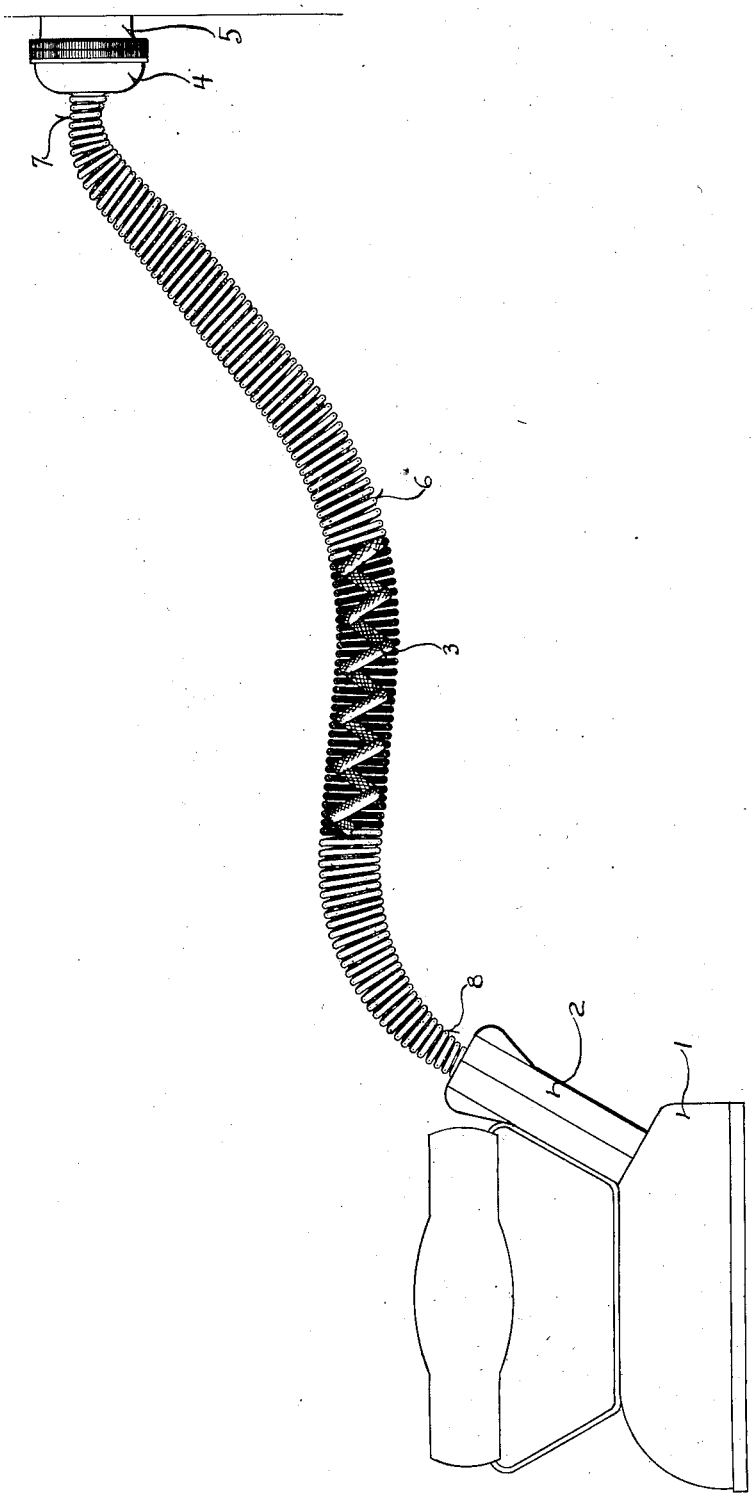
Inventor
Lucy C. Smith
By
Attorneys Patented Nov. 5, 1929

1,734,605

UNITED STATES PATENT OFFICE

LUCY C. SMITH, OF CHICAGO, ILLINOIS

CORD TAKE-UP AND PROTECTOR

Application filed August 21, 1926. Serial No. 130,733.

This invention relates to an electric cord take-up and protector.

In certain types of devices such for example as electric irons, fans, telephones, and other devices, a flexible cord runs to the device and is constantly in the way. No efficient means have been provided for both taking up the slack in the cord and protecting the cord from damage.

This defect is especially noticeable in electric irons where the cord continually gets in the way or rubs against the edge of the ironing board.

This invention is designed to overcome the defects noted above and objects of such invention are to provide a novel form of electric cord take-up and protector which not only will take up the slack in the cord in a novel manner but will at the same time actually protect the cord against damage.

Further objects are to provide an electric cord take-up and protector which does not require brackets, clamps or other auxiliary apparatus but which may be used directly with the article to which it is applied in a very simple and easy manner.

An embodiment of the invention is shown in the accompanying drawings, in which:—

The single figure is a view of an electric iron showing the cord take-up and protector as it appears when in use.

Referring to the drawings, it will be seen that an electric iron 1 is shown as equipped with the usual socket 2 which is connected by means of an electric cord 3 with a plug 4 inserted in a wall or other fixture 5. It will thus be noted that the socket 2 and the plug 4 form attaching means for connecting the iron to the source of current supply. Normally this cord hangs in the way of the operator and materially interferes with free movement. In addition to this the cord frequently drags back and forth across the edge of the ironing board or table and quickly becomes frayed and worn.

In practicing this invention a helical spring 6 surrounds the cord 3 and has preferably reduced ends 7 and 8 which are secured to the socket 2 and the plug 4. The spring is freely flexible and extensible and is of sufficient diameter to permit the ready coiling of the cord 3 therein. The convolutions of the spring 6 are sufficiently close together to retain the cord in place and prevent its passing outwardly between successive convolutions. As the iron is moved back and forth the spring elongates and allows the cord to lengthen and when the spring shortens the cord is again coiled within the spring.

At all times the cord remains within the spring and is thus mechanically protected from damage in addition to being held out of the way.

It is to be noted that no clamp or auxiliary apparatus of any type is required but that the cord take-up and protector is attached directly to the socket and to the plug so that all that is necessary in using the device is to connect the plug to the fixture and the socket to the iron and thereafter use the iron in the usual manner and with a greater degree of freedom than has heretofore been possible.

It is to be particularly noted that the device is extremely simple and does not require any additional operation in applying it and may be used as freely as an ordinary cord.

It will be seen therefore that a very simple type of cord take-up and protector has been provided by this invention which may be freely used which does not require additional devices and which is highly serviceable in operation.

Preferably the spring and cord are coiled in opposite direction as this further aids in retaining the cord within the spring.

The invention is applicable to other uses from that disclosed specifically in this case, for example it may be used for a telephone, fan, or other cord with equal facility.

Although the invention has been described in considerable detail, such description is intended as illustrative rather than limiting as the invention may be variously embodied and as the scope of such invention is to be determined as claimed.

I claim:—

An electric cord and a takeup and protector comprising a helical resilient sheath completely surrounding the cord and having attaching means at opposite ends, said cord and said sheath terminating at said attaching means, said cord being wholly contained within the sheath and having a plurality of freely formed convolutions within this sheath whereby the entire device may be freely elongated and will automatically shorten when released.

In testimony that I claim the foregoing I have hereunto set my hand at Chicago, in the county of Cook and State of Illinois.

Mrs. LUCY C. SMITH.